(12) United States Patent
Fowler

(10) Patent No.: US 6,505,802 B2
(45) Date of Patent: Jan. 14, 2003

(54) BEVERAGE HOLDER WITH ADJUSTABLE MOUNTING SYSTEM

(76) Inventor: William K. Fowler, 808 W. Oak, Miltonvale, KS (US) 67466

( * ) Notice: Subject to any disclaimer, the term of this patent is extended or adjusted under 35 U.S.C. 154(b) by 0 days.

(21) Appl. No.: 10/074,402

(22) Filed: Feb. 11, 2002

(65) Prior Publication Data
US 2002/0109062 A1 Aug. 15, 2002

Related U.S. Application Data
(60) Provisional application No. 60/267,996, filed on Feb. 12, 2001.

(51) Int. Cl.[7] .............................................. A47G 29/00
(52) U.S. Cl. ................................. 248/311.2; 248/230.5
(58) Field of Search .......................... 248/230.3, 230.5, 248/231.41, 231.61, 286.1, 311.2, 314; 224/926

(56) References Cited

U.S. PATENT DOCUMENTS

| | | | | |
|---|---|---|---|---|
| 3,987,993 A | * | 10/1976 | Hopkins | 248/210 |
| 4,071,175 A | | 1/1978 | Wagnon | 224/36 |
| 4,570,835 A | | 2/1986 | Criqui et al. | 224/36 |
| 4,948,080 A | | 8/1990 | Jack | 248/311.2 |
| 5,074,506 A | * | 12/1991 | Larsen | 248/309.1 |
| 5,188,327 A | * | 2/1993 | White | 248/231.81 |
| 5,190,257 A | * | 3/1993 | Gradei et al. | 248/231.71 |
| 5,513,827 A | * | 5/1996 | Michelson | 248/279.1 |
| 5,664,718 A | | 9/1997 | Vine | 224/545 |
| 5,752,687 A | | 5/1998 | Lynch | 248/311.2 |
| 5,822,918 A | * | 10/1998 | Helfman et al. | 47/39 |
| 5,881,936 A | | 3/1999 | Li | 224/413 |
| 6,227,510 B1 | * | 5/2001 | McMullen, Sr. | 248/311.2 |
| 6,390,427 B1 | * | 5/2002 | McConnell et al. | 248/231.61 |
| 6,435,469 B1 | * | 8/2002 | Ratcliff et al. | 248/535 |

* cited by examiner

Primary Examiner—Ramon O. Ramirez
Assistant Examiner—Jon A. Szumny
(74) Attorney, Agent, or Firm—Jeffrey L. Thompson; Thompson & Thompson, P.A.

(57) ABSTRACT

A beverage holder having an adjustable mounting system includes a cylindrical-shaped cup member and a clamp assembly which are secured together using a threaded fastening member. The cup member has a recessed portion offset outwardly from the sidewall, and a slotted opening formed in the recessed portion which extends along a length of the cup member. The fastening member extends through the slotted opening and into a corresponding opening in the clamp assembly. The fastening member is arranged to slide along the slotted opening for vertical adjustment of the cup member relative to the clamp member. The fastening member also allows the cup member to be pivotally adjusted relative to the clamp assembly to adapt to different angles of bars on which the beverage holder is mounted. The cup member has a cutaway portion that allows access to the fastening member and accommodates a handle of a beverage container.

20 Claims, 2 Drawing Sheets

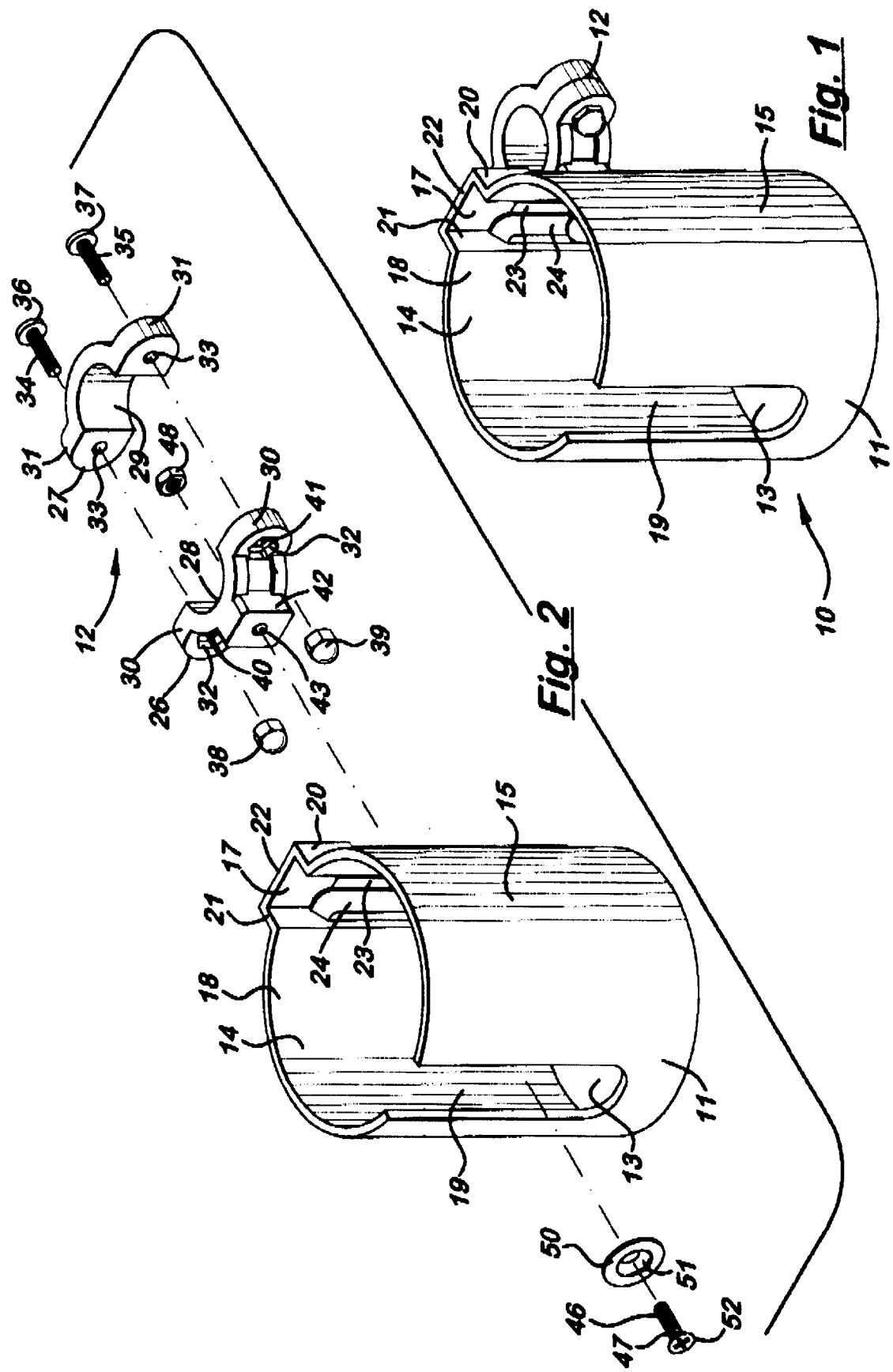

BEVERAGE HOLDER WITH ADJUSTABLE MOUNTING SYSTEM

RELATED APPLICATIONS

This application claims the benefit under 355 U.S.C. 119(e) of U.S. Provisional Patent Application Ser. No. 60/267,996 filed on Feb. 12, 2001.

BACKGROUND OF THE INVENTION

1. Field of the Invention

The present invention relates generally to beverage and cup holders. In particular, the present invention relates to beverage holders for use with vehicles having handlebars, such as motorcycles, bicycles, ATVs, snowmobiles, boats, lawnmowers, and so forth.

2. Description of the Related Art

Beverage holders for use in automotive vehicles are well known. Such beverage holders are typically designed to support the beverage container from the bottom, with sidewalls provided to restrain horizontal movement of the container. Most modern automotive vehicles, for example, have integrated beverage container holders in the form of depressions or retractable trays in the vehicle body. Such beverage holders allow vehicle occupants to free up their hands for other tasks, such as driving, eating, reading, etc., and to minimize spillage of beverages within the vehicle.

A similar need exists for beverage holders for use with vehicles having handlebars, such as motorcycles, bicycles, ATVs, snowmobiles, boats, lawnmowers, and the like. These vehicles are typically not equipped with integrated beverage holders, and therefore must be retrofitted with after-market beverage holders.

Examples of beverage holders for attaching to handlebars are disclosed in U.S. Pat. No. 4,570,835 issued to Criqui et al., and U.S. Pat. No. 5,752,687 issued to Lynch. Both of these prior art beverage holders include clamp structures for mounting to the handlebars of a bicycle or the like. However, these and other conventional beverage holders lack an adjustable mounting system that allows the beverage holder to be retrofitted and properly positioned for a wide variety of different handlebar arrangements. Conventional beverage holders also fail to provide a system which is sufficiently durable, functional, versatile, and attractive to satisfy consumers in the marketplace.

Thus, there is a need in the industry for an improved beverage holder which can be retrofit to vehicles having handlebars and the like and which solves the problems with the conventional beverage holders described above.

SUMMARY OF THE INVENTION

It is an object of the present invention to provide a beverage holder that can be attached to and fully adjusted to accommodate a wide variety of handlebar shapes and configurations, as well as a variety of user preferences.

It is a further object of the present invention to provide a beverage holder that is durable, functional, versatile, attractive, economical to manufacture, capable of a long operating life, and particularly well suited for use with vehicles having handlebars.

In order to solve the problems with the prior art described above, an improved beverage holder has been developed having an adjustable mounting system. The beverage holder includes a cylindrical-shaped cup member and a clamp assembly which are secured together using a threaded fastening member. The cup member has a recessed portion offset outwardly from the sidewall, and a slotted opening formed in the recessed portion which extends along a length of the cup member. The fastening member extends through the slotted opening and into a corresponding opening in the clamp assembly. The fastening member is arranged to slide along the slotted opening for vertical adjustment of the cup member relative to the clamp member. The fastening member also allows the cup member to be pivotally adjusted relative to the clamp assembly to adapt to different angles of bars on which the beverage holder is mounted. The cup member has a cutaway portion that allows access to the fastening member during mounting, and also accommodates a handle of a beverage container.

According to a broad aspect of the present invention, a beverage holder is provided, comprising: a cup member having a bottom, a top, and a sidewall extending from the bottom to the top; a clamp assembly adapted to clamp to a bar on which the beverage holder is to be mounted; and an adjustable mounting system connecting the cup member to the clamp assembly. The adjustable mounting system comprises a slotted opening extending vertically along the sidewall of the cup member, and a fastening member extending through the slotted opening and into a corresponding opening in the clamp assembly. The fastening member is arranged to slide along the slotted opening for vertical adjustment of the cup member relative to the clamp member, and allows the cup member to be pivotally adjusted relative to the clamp assembly about an axis of the fastening member to adapt to different angles of bars on which the beverage holder is to be mounted.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIG. 1 is a perspective view of a beverage holder according to a preferred embodiment of the present invention.

FIG. 2 is an exploded perspective view of the beverage holder shown in FIG. 1.

DETAILED DESCRIPTION OF THE PREFERRED EMBODIMENT

Figure 3:
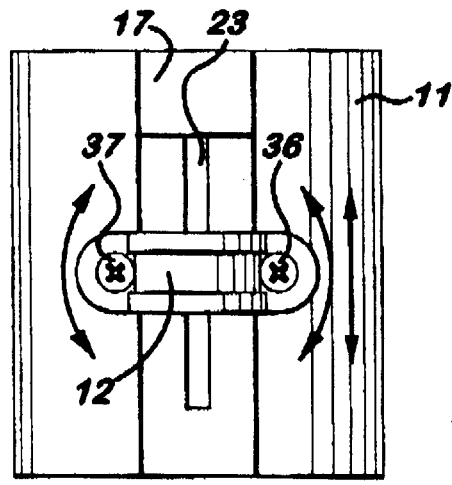
FIG. 3 is a rear view of the beverage holder of the present invention.
Figure 4:
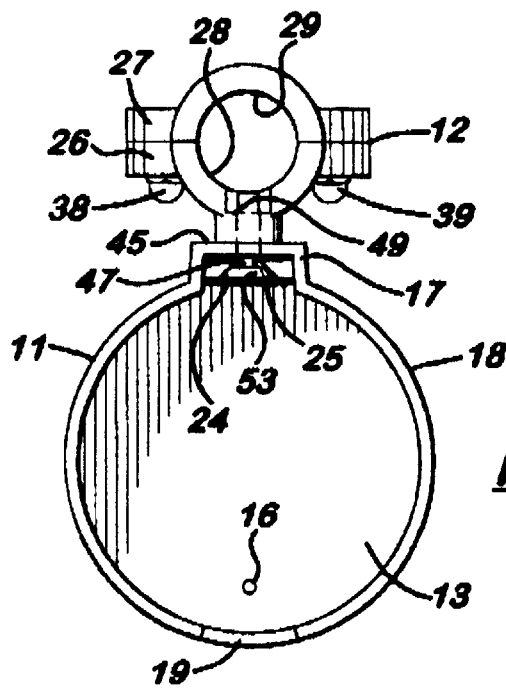
FIG. 4 is a plan view of the beverage holder of the present invention.
Figure 5:
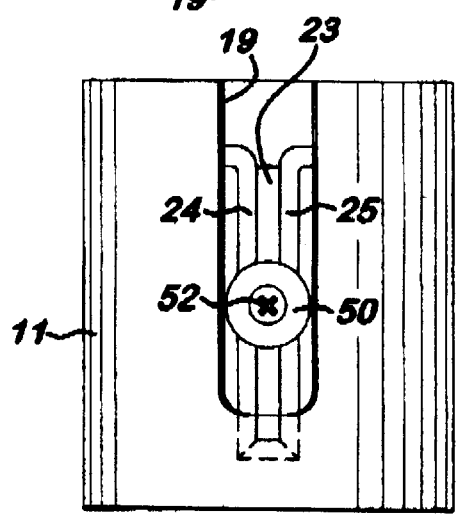
FIG. 5 is a front view of the beverage holder of the present invention.

A beverage holder 10 according to a preferred embodiment of the present invention will now be described with reference to FIGS. 1 to 5 of the accompanying drawings.

The beverage holder 10 is designed for mounting on a bar (not shown), such as the handlebar of a motorcycle, bicycle, ATV, snowmobile, boat, lawnmower, or the like. The holder 10 includes a molded cup member 11 and a clamp assembly 12 attached to the cup member 11. The cup member 11 and clamp assembly 12 are preferably made of injection molded plastic.

The molded cup member 11 has a generally cylindrical shape with a substantially closed bottom 13, an open top 14, and a sidewall 15 extending from the bottom 13 to the top 14. A drain hole 16 is provided in the substantially closed bottom 13 to allow spilled liquids, rain, and so forth to drain from the cup member 11. The sidewall 15 includes a recessed portion 17 on one side which is offset from the main part 18 of the sidewall 15. The sidewall 15 also includes a cutaway portion 19 formed in the opposite side thereof from the recessed portion 17.

The recessed portion 17 includes first and second walls 20, 21 that extend radially outwardly from the main part 18 of the sidewall 15, and a third wall 22 extending between the first and second walls 20, 21. The third wall 22 has a slotted opening in the form of a beveled slot 23 formed therein which extends along the length of the cup member 11 in a vertical direction. The beveled slot 23 has tapered inner surfaces 24, 25 that converge toward one another in a direction toward the clamp assembly 12.

The clamp assembly 12 includes first and second clamp members 26, 27 each having a semicylindrical inner surface 28, 29 and a pair of mounting flanges 30, 31. Mounting holes 32, 33 are formed in each of the mounting flanges 30, 31. The clamp members 26, 27 are assembled together to encircle a bar on which the beverage holder 10 is to be mounted. A pair of fastener assemblies 34, 35 secure the clamp members 26, 27 to the bar. In the preferred embodiment, the fastener assemblies 34, 35 comprise threaded bolts 36, 37 extended through the mounting holes 32, 33 into mating engagement with threaded cap nuts 38, 39. The back sides of the mounting flanges 30, 31 of the first clamp member 26 include recesses 40, 41 into which the threaded cap nuts 38, 39 are received. The recesses 40, 41 have an inner shape corresponding to the outer shape of the cap nuts 38, 39 to receive the cap nuts 38, 39 therein and prevent the cap nuts from rotating as the threaded bolts 36, 37 are tightened.

The first clamp member 26 also includes a raised portion 42 and a mounting bore 43 extending therethrough. The raised portion 42 has a flat surface 44 that abuts with a corresponding flat area 45 on an outer surface of the third wall 22 of the recessed portion 17 of the cup member 11. A fastening member 46 extends through the beveled slot 23 of the cup member 11 and the mounting bore 43 of the first clamp member 26 to secure the cup member 11 to the clamp assembly 12. In the preferred embodiment, the fastening member 46 is a threaded bolt 47 extended through the beveled slot 23 and the mounting bore 43 of the first clamp member 26 into mating engagement with a threaded nut 48.

The first clamp member 26 includes a recess 49 formed in its inner surface 28 into which the threaded nut 48 is received. The recess 49 has an inner shape corresponding to the outer shape of the nut 48 to prevent the nut from rotating as the threaded bolt 47 is tightened. The fastening member 46 further includes a dimpled washer 50 having a countersunk recess 51 on one side into which the tapered head 52 of the threaded bolt 47 is received. The dimpled washer 50 has a tapered surface 53 on its other side which rests on the tapered surfaces 24, 25 on each side of the beveled slot 23. This mounting arrangement allows vertical adjustment of the cup member 11 by sliding the dimpled washer 50 and threaded bolt 47 up or down the beveled slot 23 prior to tightening the fastening member 46. The tapered surfaces 24, 25, 53 ensure a snug fit between the cup member 11 and the clamp member 26 when the fastening member 46 is tightened.

The cutaway portion 19 formed in the opposite side of the cup member 11 allows access to the fastening member 46 inserted through the beveled slot 23. The cutaway portion 19 also accommodates the handle of a beverage container, such as a coffee cup or mug (not shown), after the fastening member 46 has been tightened to secure the cup member 11 to the clamp assembly 12.

In operation, the first clamp member 26 is attached, at least loosely, to the cup member 11 by extending the threaded bolt 47 through the dimpled washer 50, the beveled slot 23, and the mounting bore 43 and into mating engagement with the threaded nut 48. The second clamp member 27 is then attached to the first clamp member 26 by extending the threaded bolts 36, 37 through the mounting holes 32, 33 into mating engagement with the threaded cap nuts 38, 39. Before tightening any of the threaded members 36, 37, 43, the cup member 11 can be leveled by a combination of rotating the clamp assembly 12 on the bar and rotating the cup member 11 on the threaded bolt 47 relative to the clamp assembly 12. The cup member 11 can also be positioned vertically along the beveled slot 23 to raise and lower the cup member 11 relative to the bar on which it is mounted. Once the cup member 11 and clamp assembly 12 are properly positioned, the threaded bolts 36, 37, 47 are all tightened in their corresponding threaded nuts 38, 39, 48 to secure the beverage holder 10 in place.

The cup member 11 and clamp assembly 12 can be adjusted to fit any angle of bar on which the beverage holder 10 is mounted. The angle and height adjustments allow the beverage holder 10 to be used with virtually any motorcycle handlebar and a variety of other applications, such as golf carts, bicycles, ATVs, snowmobiles, boats, lawnmowers, and so forth.

While the invention has been specifically described in connection with specific embodiments thereof, it is to be understood that this is by way of illustration and not of limitation, and the scope of the appended claims should be construed as broadly as the prior art will permit.

What is claimed is:

1. A beverage holder, comprising:
   a cup member having a generally cylindrical shape with a substantially closed bottom, an open top, and a sidewall extending from the bottom to the top;
   a clamp assembly having first and second clamp members which are assembled together and adapted to encircle and clamp to a bar on which the beverage holder is to be mounted; and
   an adjustable mounting system connecting the cup member to the clamp assembly, said adjustable mounting system comprising a recessed portion which is offset outwardly from the sidewall, a slotted opening formed in said recessed portion which extends along a length of the cup member in a vertical direction, and a fastening member extending through said slotted opening and into a corresponding opening in one of said clamp members, said fastening member being operable to allow said cup member to be pivotally and vertically adjusted relative to said clamp assembly and to secure said cup member to said clamp assembly in a desired fixed position.

2. The beverage holder according to claim 1, wherein said fastening member comprises a threaded bolt and a threaded nut.

3. The beverage holder according to claim 2, wherein threaded bolt has a tapered head, and said fastening member further comprises a dimpled washer having a countersunk recess on one side into which the tapered head is received, said dimpled washer being disposed within said recessed portion of said cup member and slidable therealong.

4. The beverage holder according to claim 3, wherein said slotted opening has tapered inner surfaces that converge toward one another in a direction toward said clamp assembly, and said dimpled washer has a tapered surface which engages the tapered inner surfaces of the slotted opening.

5. The beverage holder according to claim 1, wherein said cup member has a cutaway portion in the sidewall on a side opposite said recessed portion, said cutaway portion being arranged to allow access to the fastening member inserted through the beveled slot and to accommodate a handle of a beverage container placed in said cup member.

6. The beverage holder according to claim 1, wherein said first and second clamp members each comprises a semicylindrical inner surface and a pair of mounting flanges with mounting holes formed in each of the mounting flanges, said first and second clamp members being assembled together with the mounting holes of the first clamp member aligned with the mounting holes of the second clamp member and a pair of fastener assemblies extended through the respective mounting holes.

7. The beverage holder according to claim 1, wherein said cup member comprises a drain hole in the substantially closed bottom.

8. The beverage holder according to claim 1, wherein said recessed portion comprises first and second walls that extend radially outwardly from a main part of the sidewall, and a third wall that extends between the first and second walls, the slotted opening being formed along a length of the third wall.

9. The beverage holder according to claim 1, wherein said corresponding opening in one of the clamp members comprises a bore through the first clamp member, and a recess formed in an inner surface of the first clamp member which accommodates a threaded nut of the fastening member.

10. The beverage holder according to claim 9, wherein said first clamp member further comprises a raised portion surrounding the bore with a flat surface that abuts with a corresponding flat area on an outer surface of the recessed portion of the cup member.

11. The beverage holder according to claim 1, wherein said cup member and said clamp members are made of injection molded plastic.

12. A beverage holder, comprising:
 a cup member having a bottom, a top, and a sidewall extending from the bottom to the top;
 a clamp assembly adapted to clamp to a bar on which the beverage holder is to be mounted; and
 an adjustable mounting system connecting the cup member to the clamp assembly, said adjustable mounting system comprising a slotted opening extending vertically along the sidewall of the cup member, and a fastening member extending through said slotted opening and into a corresponding opening in said clamp assembly, said fastening member being arranged to slide along said slotted opening for vertical adjustment of the cup member relative to the clamp member, and allowing said cup member to be pivotally adjusted relative to said clamp assembly about an axis of said fastening member to adapt to different angles of bars on which the beverage holder is to be mounted.

13. The beverage holder according to claim 12, wherein said fastening member comprises a threaded bolt and a threaded nut.

14. The beverage holder according to claim 12, wherein said threaded bolt has a tapered head, and said fastening member further comprises a dimpled washer having a countersunk recess on one side into which the tapered head is received, said dimpled washer being disposed within a recessed portion of said cup member surrounding said slotted opening.

15. The beverage holder according to claim 14, wherein said slotted opening has tapered inner surfaces that converge toward one another in a direction toward said clamp assembly, and said dimpled washer has a tapered surface which engages the tapered inner surfaces of the slotted opening.

16. The beverage holder according to claim 12, wherein said cup member has a substantially cylindrical shape with said bottom being substantially closed, said top being open, and said sidewall having a recessed portion on one side in which said slotted opening is formed, and a cutaway portion on an opposite side which allows access to the fastening member and accommodates a handle of a beverage container.

17. The beverage holder according to claim 12, wherein said clamp assembly comprises first and second clamp members each having a semicylindrical inner surface, a pair of mounting flanges, and mounting holes formed in each of the mounting flanges, said first and second clamp members being assembled together with the mounting holes of the first clamp member aligned with the mounting holes of the second clamp member and a pair of fastener assemblies extended through the respective mounting holes.

18. The beverage holder according to claim 17, wherein said corresponding opening in said clamp assembly comprises a bore through the first clamp member, and a recess formed in the inner surface of the first clamp member which accommodates a threaded nut of the fastening member.

19. The beverage holder according to claim 17, wherein said first clamp member further comprises a raised portion surrounding the bore with a flat surface that abuts with a corresponding flat area on an outer surface of the cup member.

20. The beverage holder according to claim 12, wherein said cup member and said clamp assembly are made of injection molded plastic.

* * * * *